United States Patent [19]

Tagawa

[11] Patent Number: 4,699,018
[45] Date of Patent: Oct. 13, 1987

[54] BICYCLE SPEED CHANGE LEVER ASSEMBLY

[75] Inventor: Koichi Tagawa, Kawachinagano, Japan

[73] Assignee: Maeda Industries, Ltd., Osaka, Japan

[21] Appl. No.: 908,724

[22] Filed: Sep. 18, 1986

[30] Foreign Application Priority Data

Feb. 14, 1986 [JP] Japan .............................. 61-20472[U]
Apr. 19, 1986 [JP] Japan .................................. 61-91142

[51] Int. Cl.$^4$ ......................... G05G 5/06; B62K 23/06
[52] U.S. Cl. ........................................ 74/475; 74/527; 74/501 R
[58] Field of Search ..................... 74/475, 527, 501 B; 474/80, 81, 82

[56] References Cited

U.S. PATENT DOCUMENTS

| | | | |
|---|---|---|---|
| 3,128,635 | 4/1964 | Doolittle | 74/475 X |
| 3,602,245 | 8/1971 | Meisel | 74/527 X |
| 4,232,564 | 11/1980 | Yamasaki | 74/475 |
| 4,267,744 | 5/1981 | Yamasaki | 74/475 |
| 4,454,784 | 6/1984 | Shimano | 74/475 |

FOREIGN PATENT DOCUMENTS 60-209376 10/1985 Japan .
60-209377 10/1985 Japan .
61-33380 2/1986 Japan .

Primary Examiner—Allan D. Herrmann
Attorney, Agent, or Firm—Birch, Stewart, Kolasch & Birch

[57] ABSTRACT

A bicycle speed change lever assembly comprising a fixed support shaft, a control lever having a boss portion rotatably supported by the shaft, a click ring co-rotatable with the boss portion of the control lever and provided on one side surface thereof with an arcuate row of clicking recesses, a retainer non-rotatably supported by the shaft in facing relation to the one side surface of the click ring and loosely retaining steel balls in corresponding relation to the row of clicking recesses of the click ring, and a mode selector disposed in facing relation to the retainer and having backup portions for forcing the balls into clicking engagement with the row of clicking recesses and shelter recesses for allowing the balls to retreat thereinto.

11 Claims, 20 Drawing Figures

BICYCLE SPEED CHANGE LEVER ASSEMBLY

BACKGROUND AND SUMMARY OF THE INVENTION

1. Field of the Invention

This invention relates to a bicycle speed change lever assembly, and more particularly to improvements in the lever assembly for operating a derailleur to shift a drive chain from one to another of diametrically different sprockets of a multiple freewheel or multiple chainwheel. More specifically, the invention is directed to a bicycle speed change lever of the type that is capable of selectively providing two operational modes.

2. Prior Art

As is well known, bicycles are equipped in many cases with a speed change mechanism to enable cycling suited to a particular road condition or to a cyclist's desire. Such speed change mechanism includes for example a rear derailleur of the type that comprises a shiftable cage rotatably supporting a pair of guide pulleys and a control mechanism such as a parallelogrammic linkage mechanism for displacing the guide pulleys laterally of a multiple freewheel to shift a drive chain engaging with the pulleys from one sprocket to another of the freewheel. The speed change mechanism may further comprise a pair of parallel guide plates and a control mechanism such as a parallelogrammic linkage mechanism, similar to that of the rear derailleur, for displacing the guide plates laterally of a multiple chainwheel to shift the drive chain from one sprocket to another of the chainwheel.

The movement of the guide pulleys or the guide plates is controlled by a control lever which is operatively connected to the parallelogrammic linkage mechanism via a control cable a part of which extends along a cable winding groove formed in an outer circumference of a cylindrical boss portion of the control lever which has a handle portion extending radially from the boss portion. The control lever is pivotally mounted at the boss portion to a suitable part of a bicycle frame. When the control lever is pivoted, the cable is wound up along the winding groove onto the boss portion or paid out therefrom to vary a tension of the cable thereby to regulate the parallelogrammic linkage so that it is correspondingly deformed to bring the guide pulleys or the guide plates to a lateral position predetermined by the pivotal position of the control lever.

Normally, the control lever is pivoted steplessly. It is, thus, quite difficult for an unskillful cyclist to so operate the control lever as to bring the guide pulleys or the guide plates to an optimum position relative to each sprocket of the multiple freewheel or the multiple chainwheel. As such, the guide pulleys or the guide plates are sometimes stopped erroneously at a position intermediate two adjacent sprockets, failing to effect intended shifting of the drive chain onto a selected sprocket of the multiple freewheel or the multiple chainwheel. This gives rise to objectionable gear noises or unwanted vibration of the drive chain.

In order to improve the maneuverability of the control lever, it has been proposed to incorporate into the lever assembly a click mechanism which serves to clickingly hold the control lever at each of predetermined pivotal positions. With the use of the click mechanism, any cyclist, skilled or unskilled, can easily operate the control lever to bring the guide pulleys or the guide plates accurately to an optimum position immediately under a selected sprocket of the multiple freewheel or the multiple chainwheel and thereby conduct desired speed change.

However, the proposed clicking type lever assembly is not always advantageous and can sometimes become troublesome for example when the length of the control cable spanning between the control lever and the derailleur unexpectedly increases because such an increase causes a positional deviation of the guide pulleys or the guide plates from an intended gear position corresponding to each clicked pivotal position of the control lever. Although the positional deviation of the guide pulleys or the guide plates can be corrected by readjusting the cable length, such length readjustment requires considerable time and skill.

Japanese Patent Application Laid-open No. 60-209377 (Application No. 59-67163 filed Apr. 3, 1984, Inventor: Masashi Nagano) discloses a bicycle speed change lever assembly which has overcome the above described disadvantage of the conventional clicking type lever assembly. More specifically, the lever assembly of this Laid-open Application comprises a control lever rotatably mounted on a fixed support shaft, a click ring mounted to the control lever for co-rotation therewith and axially divided into a non-clicking zone having a smooth inner contact surface and a clicking zone formed with a pair of diametrically opposite arcuate rows of clicking holes in identical arrangement, a cap non-rotatably mounted on the support shaft, an elastic C-ring retainer non-rotatably but axially slidably mounted on the cap within the click ring and rotatably holding a pair of steel balls in abutment with the click ring, and a mode selector for axially moving the retainer relative to the click ring.

In operation of the lever assembly with the balls positioned in the clicking zone of the click ring, the control lever can be clickingly pivoted on the support shaft by the successive engagement of the balls into the respective clicking holes of the click ring.

In addition to such a clicking operational mode, the mode selector may be operated to displace the balls into abutment with the smooth contact surface of the click ring in the non-clicking zone thereof, whereby the control lever can be pivoted steplessly. During this non-clicking operational mode, the cap is clamped by a bolt to press a friction disc into frictional engagement with the control lever, so that the lever can be frictionally held at any pivotal position despite a tension applied through a control cable.

However, the lever assembly of Japan No. 60-209377 has a drawback that the click ring is liable to damage during the non-clicking operational mode due to contact of the balls with the click ring under the biasing force of the C-ring retainer. In fact, the C-ring retainer is diametrically contracted during the non-clicking operational mode to increase the biasing force thereof, making the problem more serious.

Japanese Patent Application Laid-open No. 61-33380 also discloses a speed change lever assembly which enables two operational modes, i.e., clicking and non-clicking modes. More particularly, the lever assembly of this Laid-open Application comprises a click member having a cylindrical body non-rotatably fitted on a fixed support shaft and an annular end flange formed on one side surface thereof with a pair of diametrically opposite sets of clicking serrations in identical arrangement. A control lever is rotatably mounted on the cylindrical body of the click member. An engaging ring co-rotatable with the control lever is slidably fitted on the cylindrical body of the click member in facing relation to the annular end flange of the click member and has a pair of diametrically opposite engaging ridges. A spring urges the engaging ring toward the annular flange of the click member, so that the engaging ridges of the ring come into selective engagement with the clicking serrations in the respective sets. A pair of pusher pins movably penetrate through the annular end flange of the click member for sliding abutment with the engaging ring. A rotationally operable mode selector incorporating a cam means operates the pusher pins to move the engaging ring toward and away from the annular end flange of the click member.

When the engaging ring is close to the annular end flange of the click member with the ridges engaging with the clicking serrations, the control lever can be clickingly pivoted on the support shaft. On the other hand, when the engaging ring is moved away from the annular end flange against the urging force of the spring by means of the mode selector through the pusher pins, the engaging ridges disengage from the clicking serrations to enable stepless pivotal movement of the control lever.

The lever assembly of Japan No. 61-33380, however, has a disadvantage similar to that of Japan No. 60-209377 since during the non-clicking operational mode the engaging ring is kept in sliding contact with the pusher pins under the increased urging force of the compressed spring.

It is, therefore, an object of the present invention to provide a speed change lever assembly which, while ensuring selection between a clicking operational mode and a non-clicking operational mode, permits elimination of the above discussed drawbacks to achieve a longer service life.

Another object of the invention is to provide a bicycle speed change lever assembly which has two or more kinds of clicking operational modes in addition to the non-clicking operational mode.

According to the present invention, there is provided a bicycle speed change lever assembly comprising a support shaft fixed to a bicycle frame; a control lever having a hollow boss portion rotatable about the support shaft and having a handle portion integral with and extending from the boss portion, an annular internal space being formed in the boss portion; a click ring accommodated in the internal space and co-rotatable with the boss portion, the click ring being provided on one side surface thereof with at least one arcuate row of clicking recesses; a retainer disposed in juxtaposition to the click ring in facing relation to the one side surface of the click ring and non-rotatable relative to the support shaft; at least one steel ball loosely retained by the retainer in corresponding relation to the row of clicking recesses and having a diameter larger than the wall thickness of the retainer; elastic means for urging the click ring toward the retainer; a mode selector disposed in juxtaposition to the retainer so that the retainer is interposed between the mode selector and the click ring, the mode selector being provided on one side thereof facing the retainer with at least one backup portion and at least one shelter recess, the mode selector being angularly adjustable to take a selected one of angular positions which include a backup position in which the backup portion forces the ball into abutment with the one side surface of the click ring and a non-backup position in which the ball is allowed to retreat into the shelter recess; and means for locking the mode selector at the selected one of angular positions.

Other objects, features and advantages of the present invention will become apparent from the description of preferred embodiments given with reference to the accompanying drawings.

DESCRIPTION OF THE PREFERRED EMBODIMENTS

Figure 1:
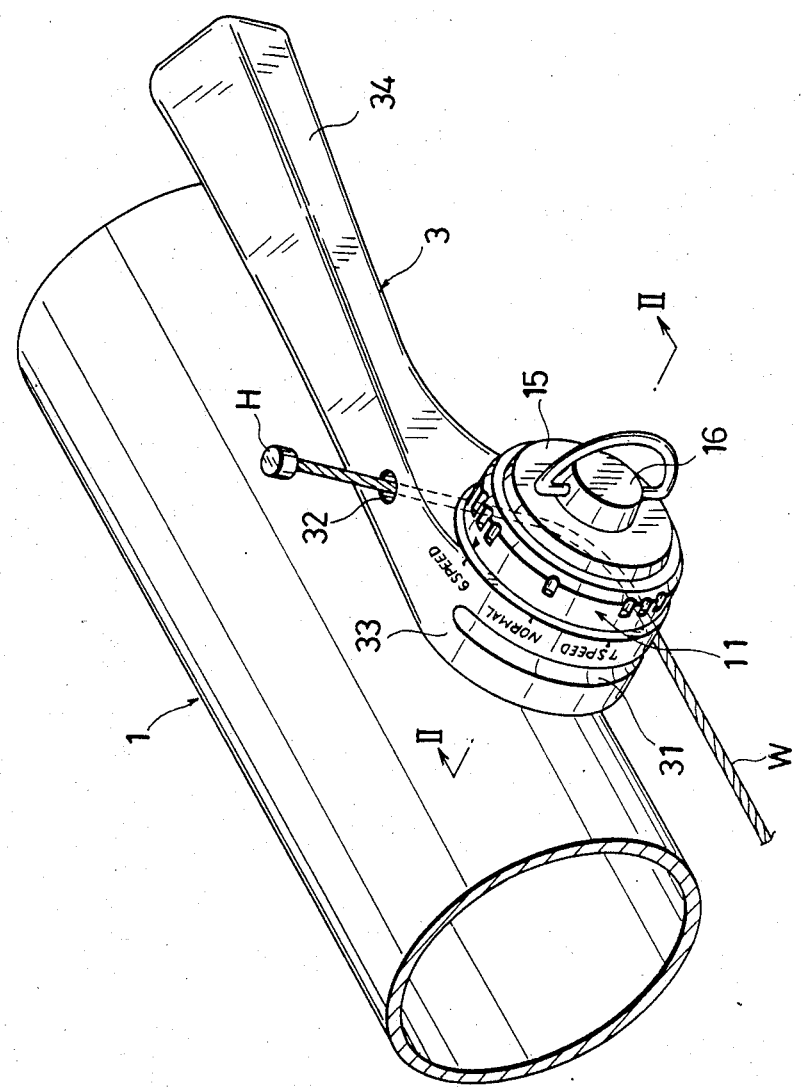
FIG. 1 is an overall perspective view of a bicycle speed change lever assembly embodying the invention.

Throughout various Figures of the drawings, like structural elements which are substantially identical or similar are referred to by the same reference numerals and characters.

Referring now to FIGS. 1 to 9, a bicycle speed change lever assembly according to the present invention is illustrated as having a support shaft 2, a control lever 3, a ratchet mechanism 5, and a click mechanism 6. The control lever 3 is pivotal on the support shaft 2 to wind up or loosen a control cable W, so that a pair of guide pulleys of a known, unillustrated rear derailleur are displaced laterally to shift an unillustrated drive chain from one sprocket to another of a known multiple freewheel (not shown), or so that a pair of unillustrated guide plates of a known, unillustrated front derailleur are displaced laterally to shift the chain from one sprocket to another of a known multiple chainwheel (not shown), conventionally.

The support shaft 2 is rigidly secured to a suitable part 1, such as a down tube, of a bicycle frame directly by brazing an illustrated rectangular shaft base 2a to the frame part 1 or indirectly by means of a known, unillustrated clamp band which can be tightly mounted onto the frame part 1 with the aid of a clamp screw and a nut (not shown), conventionally. The shaft 2 has a cylindrical rear portion 21 and a partially flattened front portion 22 which is oblong in cross section and formed internally with a threaded axial bore 23.

The control lever 3 has a cylindrical boss portion 33 which is formed externally with a circumferential groove 31 for guiding the control cable W. A handle portion 34 of the lever 3 extends from the boss portion 33, conventionally. The handle portion 34 is provided adjacent to the boss portion 33 with a stepped accommodation hole 32 for anchoring in its larger diameter space a stopper head H attached to one end of the control cable W.

Figure 2:
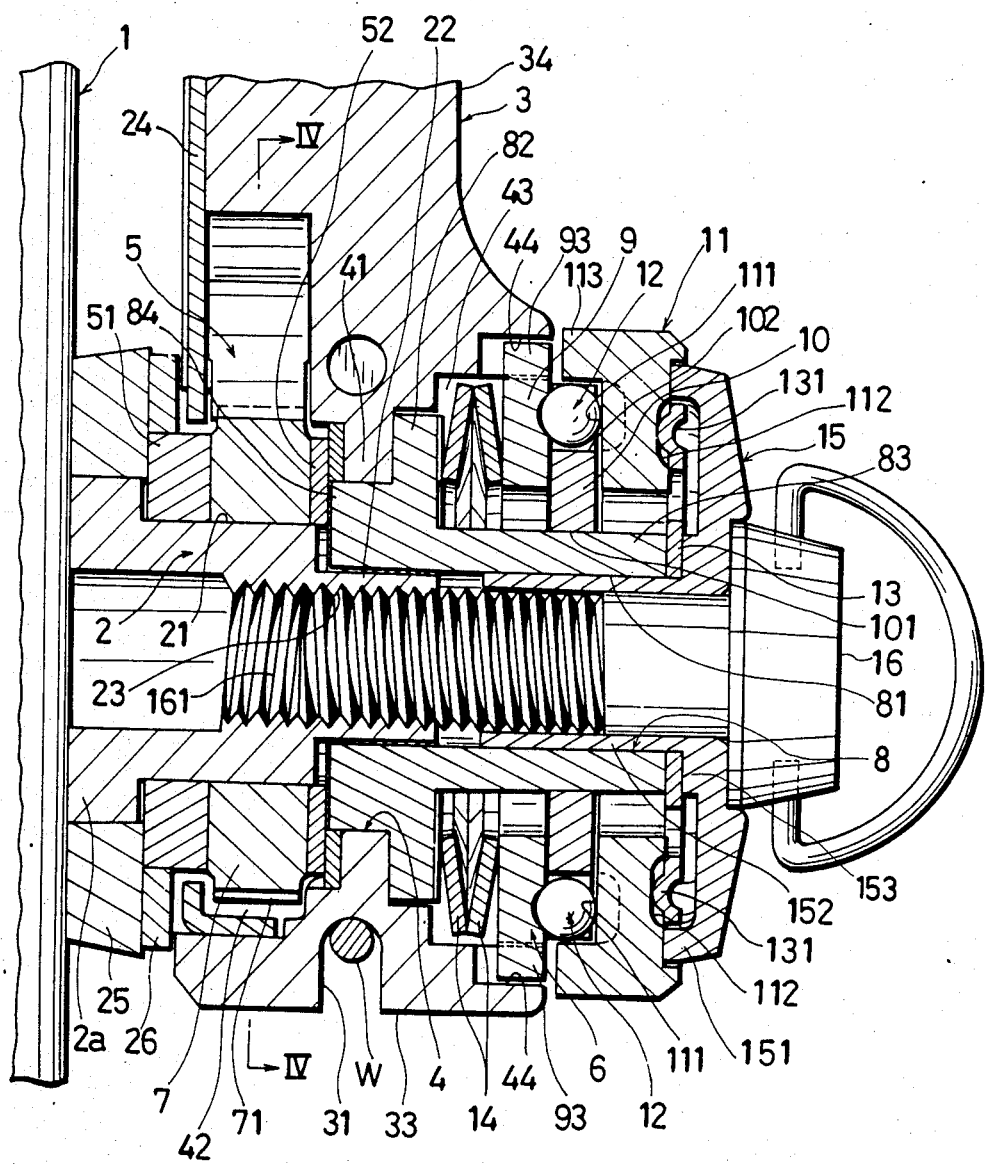
FIG. 2 is an enlarged fragmentary section taken on lines II—II in FIG. 1.

The boss portion 33 is further formed with an axial through-hole 4 which is divided by an annular internal partition flange 41 into a first chamber 42 and a second chamber 43, as best illustrated in FIG. 2. The first chamber 42 houses the ratchet mechanism 5, whereas the second chamber 43 accommodates the click mechanism 6 which features the present invention.

Figure 4:
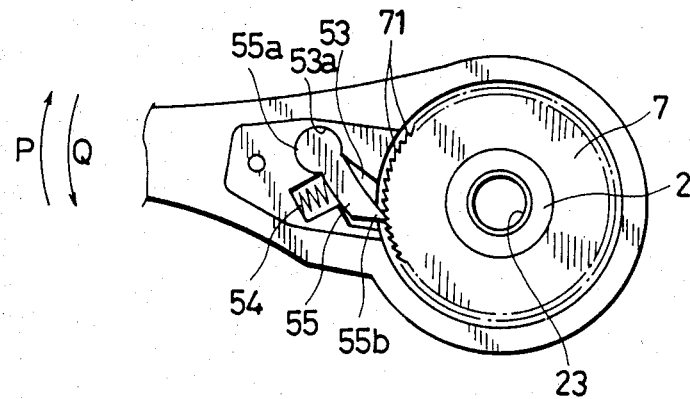
FIG. 4 is a reduced section taken on lines IV—IV in FIG. 2 to illustrate a ratchet mechanism.

The ratchet mechanism 5 includes a ratchet roller 7 having a number of teeth 71 formed on its outer circumference and rotatably mounted on the cylindrical rear portion 21 of the support shaft 2. The ratchet roller 7 is sandwiched between a pair of friction rings 51, 52 which are on the rear portion 21 in pressing contact with the roller 7. The first chamber 42 of the boss portion 33 communicates with a seating space 53 formed adjacent thereto for receiving a ratchet pawl 55, as illustrated in FIG. 4. The seating space 53 has a substantially circular portion 53a while the pawl 55 has a corresponding circular base 55a relatively rotatable in the circular portion 53a, so that the pawl 55 is pivotal within a limited angular range. A coil spring 54 urges the pawl 55 in one direction to keep its front edge 55b in engagement with teeth 71 of the ratchet roller 7.

The ratchet mechanism 5 enables the control lever 3 to pivot in a cable winding direction, i.e., the direction of the arrow P in FIG. 4, independently of the ratchet roller 7, so that such pivotal movement of the control lever 3 against the tensile force imparted to the control cable W can be conducted without involving any frictional resistance between the ratchet roller 7 and the friction rings 51, 52. On the other hand, the control lever 3 pivots in the direction of the arrow Q to cause rotation of the ratchet roller 7, whereby the frictional resistance produced between the roller 7 and the friction rings 51, 52 prevents the control lever 3 from unintentionally pivoting in the direction Q under influence of the tensile force imparted to the control cable W. The pawl 55 is prevented from accidentally coming out of the seating space 53 by an extension 24a of a ratchet cover 24 (FIG. 3) attached to the control lever 3. Indicated at 25 is a detent washer fitted onto the rectangular base 2a of the support shaft 2 while indicated at 26 is a spacer washer for adjustment a clearance between the detent washer 25 and the cover 24. Reference numeral 25a designates a stopper ear engageable with a lower side of the handle portion 34 of the control lever 3 for restriction of an excessive downward rotation of the lever 3.

A lever mount 8 has an axial through-hole 81 corresponding in cross-sectional shape to the front portion 22 of the shaft 2 for non-rotatable but slidable mounting of the lever mount on the support shaft 2. The lever mount 8 also has an outward collar 82 formed integrally at an intermediate portion thereof, a flattened front portion 83 disposed on one side of the collar 82, and a cylindrical rear portion 84 arranged on the other side of the collar 82 and closely fittable in the inward flange 41 to project partially into the first chamber 42 of the boss portion 33. Thus, when the lever mount 8 is inserted into the second chamber 43 of the boss portion 33, the outward collar 82 comes into abutment with the inward flange 41, whereas the cylindrical rear portion 84 come into pressing contact with the friction ring 52 to produce a frictional resistance between the ratchet roller 7 and both of the friction rings 51, 52. In this condition, an annular internal space is formed within the first chamber 43 around the front portion 83 of the lever mount 8. It will be apparent that the axial through-hole 81 of the lever mount 8 as well as the front portion 22 of the support shaft 2 can take any other cross-sectional shape which enables non-rotatable mounting of the lever mount 8 on the support shaft 2. Similarly, the front portion 83 of the lever mount 8 may also take any other non-circular form in cross section than that illustrated in FIG. 3.

The click mechanism 6 is arranged on the flattened front portion 83 of the lever mount 8 and includes a click ring 9, a retainer 10, a ring-form mode selector 11, and a plurality of rolling elements 12 including those designated by reference numerals 12a, 12b as will be hereinafter described.

The click ring 9 is provided on its outer circumference with a plurality of angularly spaced integral ears 93 engageable with a plurality of corresponding notches 44 formed in the wall thickness of the lever boss portion 33 in the second chamber 43. When the ears 93 are in engagement with the notches 44, the click ring 9 is co-rotatable with the control lever 3 and axially slidable along the notches 44 within a slight range defined by an axial length of the notches 44.

Figure 3:
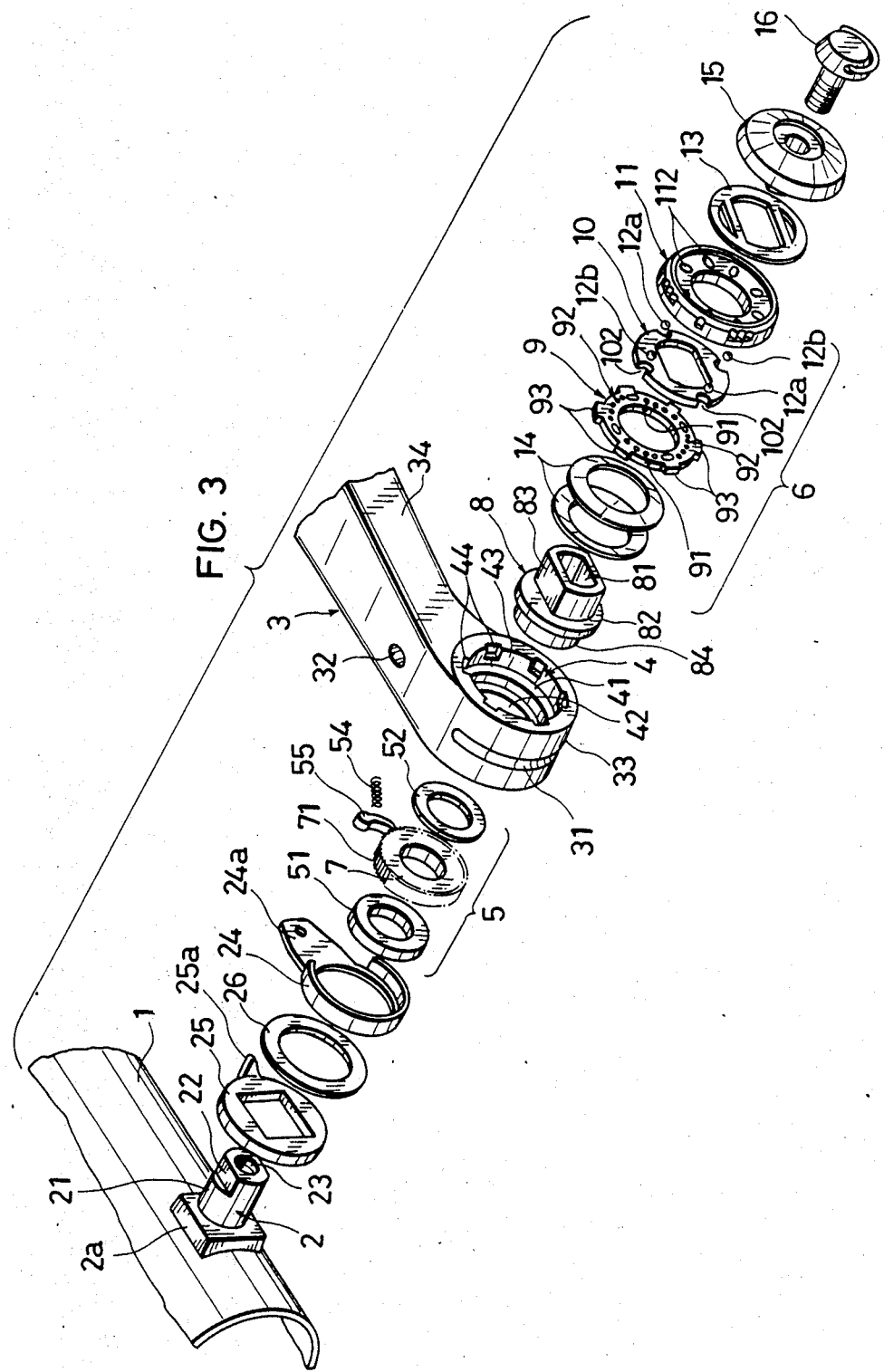
FIG. 3 is an exploded perspective view of the lever assembly of FIG. 1.

In the illustrated embodiment, the click ring 9 is further provided on its front or forward side surface with four groups of clicking recesses generally represented by reference numerals 91, 92 as shown in FIG. 3. More specifically, each of the two groups 91 includes the clicking recesses 91a–91f while each of the groups 92 includes the clicking recesses 92a–92g, the four groups 91, 92 being in angularly different zones A, A', B, B' each defined by a quater of circle, respectively, as clearly shown in FIG. 5. The recesses in each zone are aligned in an arcuate row. Such rows, four in total, surround the support shaft 2. The two groups of the recesses 91 in the diametrically opposite zones A, A' are identical in arrangement and respectively have six clicking recesses 91a–91f for six stage speed change, whereas the remaining two groups of the recesses 92 in the other diametrically opposite zones B, B' respectively have seven clicking recesses 92a–92g in identical arrangement for seven stage speed change. For simplification of the arrangement, an elongated clicking recess 91 may be provided at the boundary between each two adjacent zones to be commonly used for the corresponding two recess groups, as illustrated.

The retainer 10 has a central opening 101 shaped to enable non-rotatable mounting of the retainer 10 onto the flattened front portion 83 of the lever mount 8. The retainer 10 is in facing relation to the front or outward surface of the click ring 9.

The outer peripheral portion of the retainer 10 is formed with a plurality of equiangularly spaced, U-shaped cutouts 102 for loosely receiving the rolling elements 12 which, according to the illustrated example, are in the form of steel balls 12a, 12b each for one of the recess groups 91a-91f, 92a-92g of the click ring 9. A diameter of the steel balls 12a, 12b is larger than the wall thickness of the retainer 10. If desired, the steel balls may be replaced by rollers (not shown).

The ring-form mode selector 11 is rotatably mounted on the front portion 83 of the lever mount 8 so as to face the front or outward surface of the retainer ring 10. Thus, the retainer ring 10 is sandwiched between the click ring 9 and the mode selector 11. As illustrated in FIGS. 6 to 9, the mode selector 11 has a pair of diametrically opposite backup portions 111 on its rear or inward surface that faces the retainer 9. More specifically, the backup portions 111 in the illustrated example are provided by a pair of diametrically opposed bulges 11b formed at the boundaries of a pair of symmetrically arranged arcuate grooves 11b for receiving the balls 12a, 12b, so that the backup bulges 111 forces selected two of the balls, i.e., the balls 12a or 12b, against the click ring 9. The other side surface (front or forward surface) of the mode selector 11 is formed with positioning recesses 112 disposed in a circular row at an angular interval of 45 degrees. These recesses 112 are cooperative with a locking plate 13 for the purpose to be described hereinafter. The outer peripheral portion of the mode selector 11 is formed with a cylindrical inward extension 113 which surrounds the ball retainer 10 to restrain the radial displacement of the balls 12.

Between the click ring 9 and the collar 82 of the lever mount 8 are disposed a pair of opposed belleville springs 14 acting to urge the click ring 9 toward the mode selector 11.

The above described components of the lever assembly are clamped together by means of a presser cover 15 and a clamping bolt 16. The presser cover 15 has an inwardly directed annular projection 151 whose inward face is in sliding contact with the front or outward surface of the mode selector 11. The cover further has an axial hollow projection 152 which corresponds in cross section to and extends non-rotatably into the oblong through-hole 81 of the lever mount 8. On the other hand, the bolt 16 has a threaded shank 161 insertable through the hollow central projection 152 of the cover 15 into screw engagement with the threaded bore 23 of the support shaft 2.

The mode selector 11 is rotatable on the lever mount 8 as already described but also lockable at an angular interval of 45 degrees. For this purpose, the locking member 13 is non-rotatably mounted on the partially flattened hollow projection 152 of the presser cover 15 in facing relation to the front or outward surface of the mode selector 11. The locking member 13 is provided with a pair of diametrically opposite protuberances 131 which are elastically engageable with a selected pair of the positioning recesses 112 of the mode selector 11 and which are forcibly disengageable therefrom when the mode selector 11 is angularly moved so that the protuberances 131 can be engaged with another selected pair of the positioning recesses 112.

Figure 5:
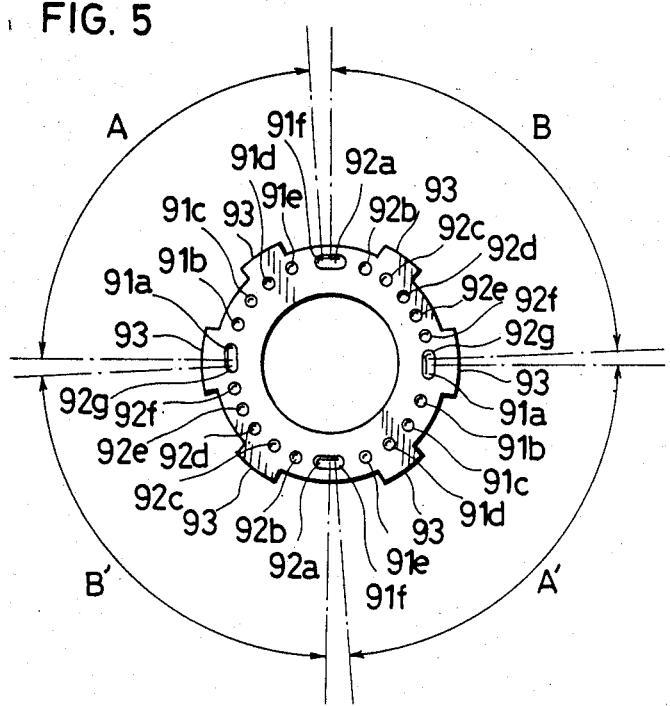
FIG. 5 is an explanatory elevation showing an example of click pattern arrangement.
Figure 6:
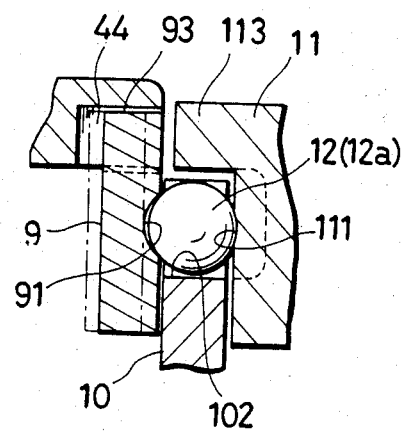
FIG. 6 is an enlarged fragmentary section of the lever assembly in a state for clicking operation.
Figure 7:
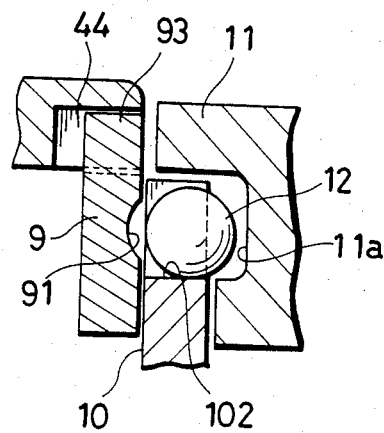
FIG. 7 is a view similar to FIG. 6 but showing the lever assembly in a state for non-clicking operation.
Figure 9:
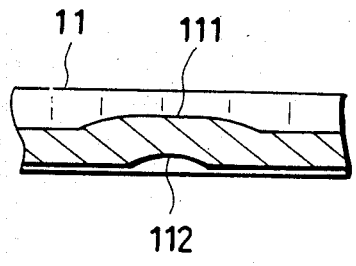
FIG. 9 is an enlarged fragmentary section taken on lines IX—IX in FIG. 8.
Figure 8:
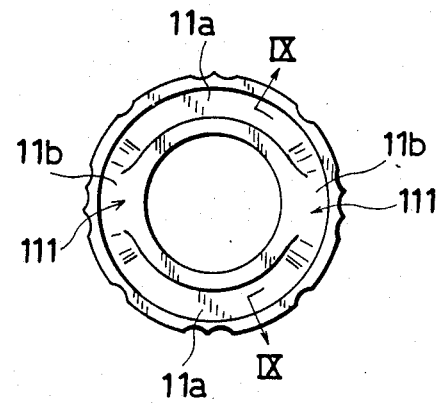
FIG. 8 is an elevation showing a backup side of a mode selector.

In operation, when the mode selector 11 is rotated and locked so that its backup bulges 111 force the pair of balls 12a only into elastic abutment with the click ring 9 in the angular zones A, A' as illustrated in FIGS. 5 and 6, the remaining pair of balls 12b are allowed to retract into the respective arcuate grooves 11a of the mode selector 11. In this state, pivotal movement of the control lever 3 accompanied by the rotation of the click ring 9 causes each of the balls 12a to clickingly engage in and disengage from each of the six clicking recesses 91a-91f in each angular zone A or A'. This enables a cyclist to adjust the control lever 3 to an exact gear position among six corresponding to a particular sprocket of a six-sprocket freewheel.

When the mode selector 11 is rotated from the previous position through 90 degrees in either rotational direction and locked there by engagement between a pair of relevant positioning recesses 112 of the mode selector 11 and the engaging protuberances 131 of the locking member 13, the mode selector 11 now backs up the pair of balls 12b in the angular zones B, B' at the backup bulges 111 while permitting the remaining balls 12a to retreat into the arcuate grooves 11a of the selector 11. In such a condition, rotation of the click ring 9 attendant with pivotal movement of the control lever 3 causes each of the balls 12b to clickingly engage in and disengage from each of the seven clicking recesses 92a-92g in each angular zone B or B'. Thus, this clicking mode gives an exact selection among the seven gear positions of the control lever 3 corresponding to a particular sprocket of a seven-sprocket freewheel.

In addition to the above described clicking modes, the mode selector 11 may be set to a non-clicking mode by turning it through 45 degrees in either rotational direction from each of the two positions previously described. In this condition, all the balls 12a, 12b are allowed to retreat into the arcuate grooves 11a of the selector 11 and thus are free of clicking engagement with any of the clicking recesses 91a-91f, 92a-92g, which results in that the control lever 3 can be brought to and frictionally held in any pivotal position. Such a non-clicking mode is advantageously selected for example in case the length of the control cable W spanning between the control lever 3 and the unillustrated derailleur is unexpectedly increased to cause a positional deviation of the derailleur pulley from an intended gear position corresponding to each clicked pivotal position of the control lever 3.

Figure 10:
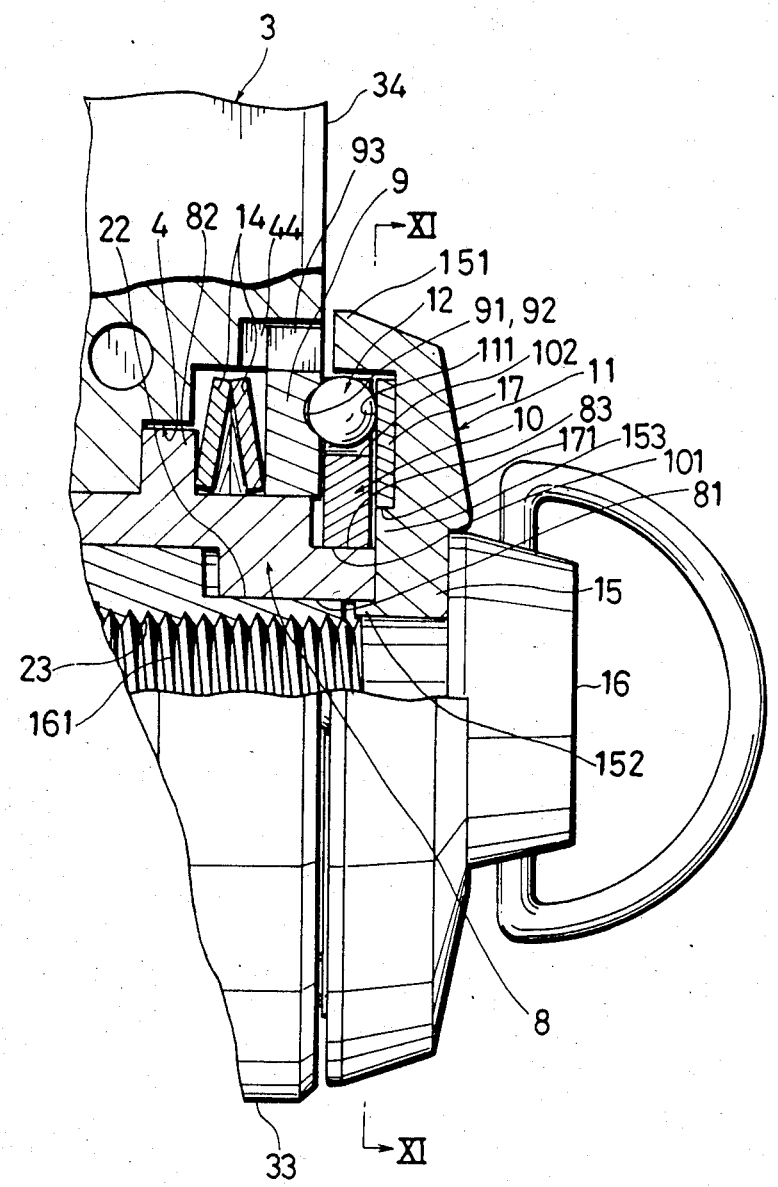
FIG. 10 is an enlarged fragmentary elevation, partly in section, illustrating a modified speed change lever assembly embodying the invention.
Figure 11:
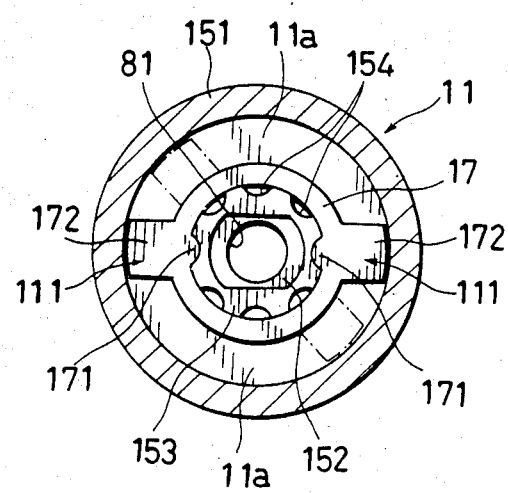
FIG. 11 is a reduced cross section taken on lines XI—XI in FIG. 10.
Figure 12:
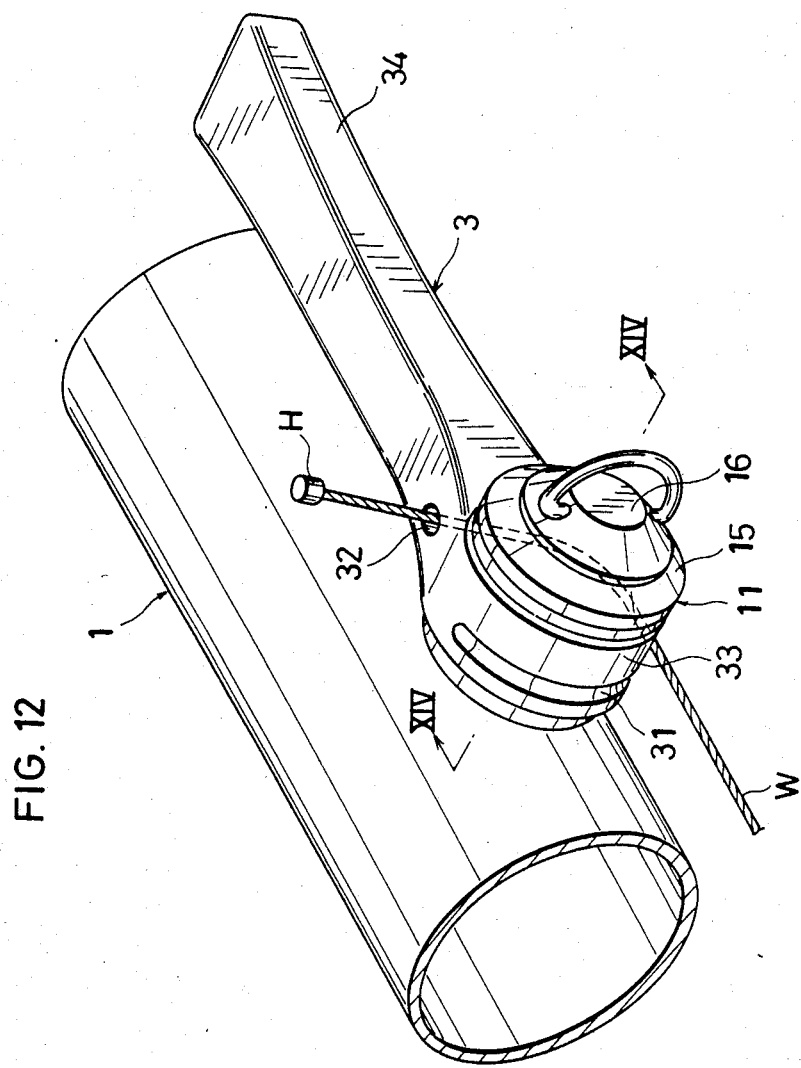
FIG. 12 is an overall perspective view of another bicycle speed change lever assembly embodying the invention.

FIGS. 10 and 11 illustrate a modified speed change lever assembly which differs from the foregoing embodiment in that a mode selector 11 consists of two separate members, that is a presser cover 15 and a selector ring 17.

Referring to FIGS. 10 and 11, the presser cover 15 centrally has an annular first projection 153 which extends axially inwardly into abutment with the outward end face of of the lever mount 8 and which is formed circumferentially with a plurality of equiangularly spaced spline grooves 154 at an angular interval of 45 degrees. The cover 15 further has a second projection 152 which is hollow and partially flattened and which extends axially inwardly from the first projection 153 into the oblong through-hole 81 of the lever mount 8 for non-rotatable engagement therewith. The cover 15 also has an external cylindrical extension 151 surrounding the retainer ring 10 to restrain unexpected radial displacement of the steel balls 12.

The selector ring 17 is fitted on the first projection 153 of the cover 15 and formed on its inner circumference with a pair of diametrically opposite positioning projections 171 fittable in a selected pair of the spline grooves 154. The outer circumference of the selector ring 17 is provided with a pair of diametrically opposite backup portions 111 which are in the form of a pair of tongues 172 projecting radially outwardly. The outer circumference and the tongues 172 of the selector ring 17 together with the outer brim 151 of the presser cover 15 define two arcuate recesses or grooves 11a.

By adjusting the angular position of the selector ring 17 relative to the cover 15, it is possible for the backup tongues 111 of the selector ring 17 to be locked at a backup position contacting a selected pair of the balls 12 while allowing the remaining pair of the balls 12 to retreat into the arcuate grooves 11a of the mode selector 11. The selector ring 17 can also be locked at a position in which all of the balls 12 retreat into the arcuate recesses 11a. The presser cover 15 or the mode selector 11 can be rotated by loosening the clamping bolt 16 enough to allow the second projection 152 of the cover 15 to come out of the through-hole 81 of the lever mount 8.

The modified lever assembly operates substantially in the same manner as the foregoing embodiment. In short, the control lever 3 can be pivoted clickingly in six stages or seven stages or steplessly without any clicks.

According to the examples illustrated in FIGS. 1 to 11, the click ring 9 are divided into the four angularly displaced zones A, A', B, B' each diametrically opposite pair of which have the same number of clicking recesses 91 or 92 in identical arrangement, consequently providing two kinds of click patterns in total. However, the four angular zones of the click ring 9 may differ from one another in the number and/or arrangement of their respective clicking recesses to provide four kinds of click patterns. In this case, the mode selector must be designed to back up only one of the four balls 12 at a time.

The click ring 9 may also be divided angularly at an interval of 120 degrees into three zones which respectively have differently patterned rows of clicking recesses to provide three different click modes while increasing the angular range of pivotal movement of the control lever 3 to 120 degrees.

In addition to the groups of clicking recesses 91, 92 carried in one side wall of the click ring 9, the other side wall of the ring 9 may also be formed with other patterns of clicking recesses, so that an increased number of click modes are attainable by simply turning over the click ring 9.

The click ring 9 may be made to rotate slightly relative to the lever boss portion 33 by increase in a circumferential dimension of the notches 44 relative to that of 93. Such specific arrangement for permitting a loose fitting of the ears 93 in the notches 44 result in that the click ring 9 and the lever 3 enables a known overshift operation of the lever 3. The possibility for the overshift operation of the lever 3 can be also realized by making the balls 12 slightly movable circumferentially of the retainer ring 10 or by providing a small gap between the circular portion 53a of the pawl seating space 53 and the circular base 55a of the ratchet pawl 55.

FIGS. 12 to 20 illustrates another speed change lever assembly which dispenses with a ratchet mechanism but nevertheless enables frictional pivotal movement of a control lever when the assembly is put into a non-clicking operational mode.

Referring to FIGS. 12 to 20, the lever assembly includes a support shaft 2 which, similarly to the examples of FIGS. 1 to 11, is rigidly secured to a suitable part 1 of a bicycle frame and comprises a rectangular shaft base 2a to which is non-rotatably mounted a base washer 25 having a stopper ear 25a. The shaft 2 further comprises a cylindrical rear portion 21 and a partially flattened front portion 22 which is oblong in cross section and formed internally with a threaded axial bore 23.

A control lever 3 is pivotally mounted on the support shaft 2 indirectly by means of a lever mount 8. The control lever 3 has a cylindrical boss portion 33 formed externally with a circumferential groove 31 for guiding a control cable W, and a handle portion 34 extending radially from the boss portion 33. The boss portion 33 is further formed with an axial through-hole 4 which is stepped to provide a smaller diameter section 4a and a larger diameter section 4b. The handle portion 34 is provided adjacent to the boss portion 33 with a stepped accommodation hole 32 for anchoring in its larger diameter space a stopper head H attached to one end of the control cable W.

The lever mount 8 is inserted into the through-hole 4 of the control lever 3 and has a flange portion 84, a lever mounting portion 85, a click ring mounting portion 86, a retainer mounting portion 87, and a selector positioning portion 88.

The flange portion 84 is annular and positioned at one end of the lever mount 8 as interposed between the detent washer 25 and the boss portion 33.

The lever mounting portion 85 of the lever mount 8 is tubular and has an outer diameter equal to the diameter of the smaller diameter section 4a of the boss portion 33 for rotatably supporting the control lever 3. The inner diameter of the lever mounting portion 85, on the other hand, corresponds to the outer diameter of the shaft rear portion 21.

The click ring mounting portion 86, which is diametrically reduced from the lever mounting portion 85, has an outer cylindrical surface for rotatably supporting a click ring 9 within the larger diameter section 4b of the lever boss portion 33.

The retainer mounting portion 87 is partially flattened to an oblong cross section for non-rotatably supporting a retainer 10.

The selector positioning portion 88 is generally square in cross section and disposed at the other end of the lever mount 8 for locking a mode selector 11, as hereinafter described.

Figure 13:
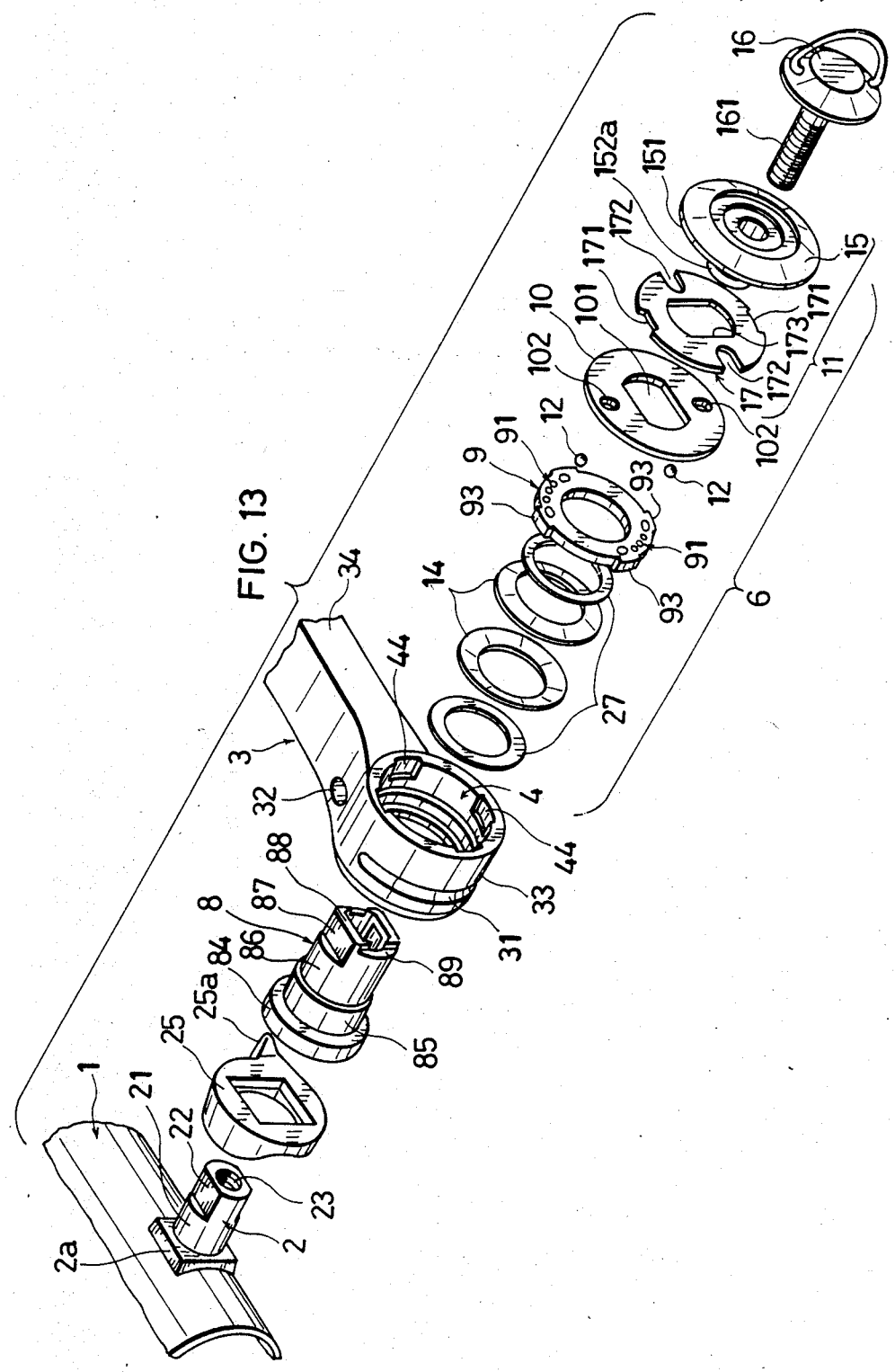
FIG. 13 is an exploded perspective view of the lever assembly illustrated in FIG. 12.

As best illustrated in FIG. 13, the boundary between the retainer mounting portion 87 and the selector positioning portion 88 is provided by a pair of step faces 89. The retainer mounting portion 87 and the selector mounting portion or end 88 are flush or continuous with each other except the location at which the step faces 89 are formed.

Figure 18:
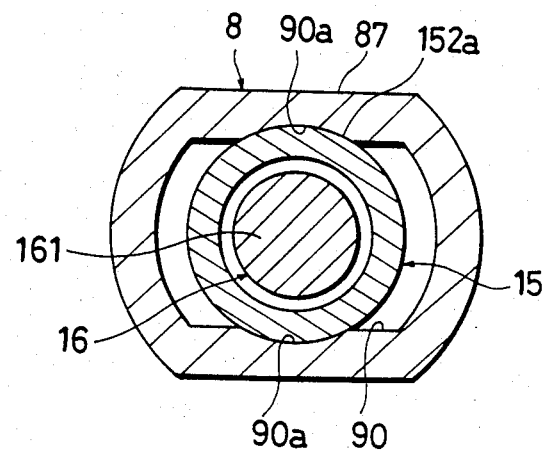
FIG. 18 is a view in section taken on lines XVIII—XVIII in FIG. 14.
Figure 19:
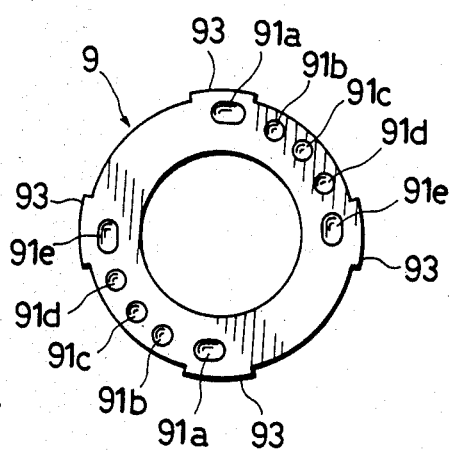
FIG. 19 is an elevation showing an one side surface of a click ring incorporated in the lever assembly of FIG. 12.
Figure 20:
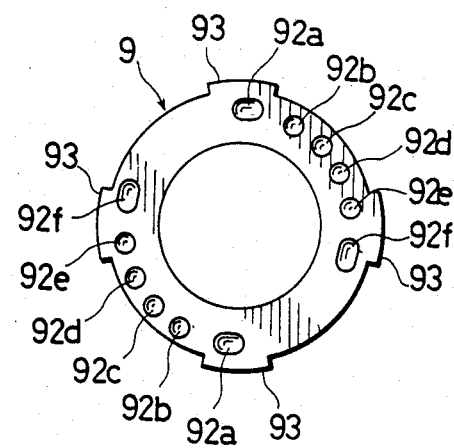
FIG. 20 is a view similar to FIG. 19 but showing the other side surface of the click ring.

The click ring mounting portion 86, the retainer mounting portion 87 and the selector positioning portion 88 internally define a continuous axial hole 90 corresponding in cross sectional shape to the shaft front portion 22 for non-rotatable mounting of the lever mount 8 on the support shaft 2. More specifically, the axial hole 90 is defined by a pair of flat surfaces and a pair of arcuate surfaces as best shown in FIG. 18, and the flat surfaces are formed with a pair of opposed axial grooves 90a which extends substantially up to the step faces 89 as apparent from FIG. 14.

The click ring 9 is formed on its outer circumference with a plurality of angularly spaced integral ears 93 engageable with a plurality of corresponding notches 44 formed in the wall thickness of the lever boss portion 33 in the larger diameter section 4b. Thus, the click ring 9 is co-rotatable with the control lever 3 but axially slidable along the notches 44 in a manner similar to the foregoing embodiments.

One side wall of the click ring 9 facing the retainer 10 is provided with a pair of diametrically opposite arcuate rows of clicking recesses 91 (FIG. 14), each row including five clicking recesses 91a–91d (FIG. 19) for five stage speed change according to the illustrated example. Similarly, the other side wall of the click ring 9 is also provided with a pair of diametrically opposite rows of clicking recesses 92 (FIG. 14), each row comprising six clicking recesses 92a–92f (FIG. 20) for six stage speed change. Reference numeral 14 designates a pair of discal cone springs interposed between a pair of washers 27 for urging the click ring 9 axially outwardly toward the retainer 10.

The retainer 10, which is in the form of a discal plate, has a central opening 101 so shaped to enable non-rotatable mounting of the retainer 10 on the retainer mounting portion 87 of the lever mount 8. Adjacent to the outer circumference of the retainer 10 are provided a pair of diametrically opposite holes 102 for loosely holding steel balls 12 in corresponding relation to the rows of clicking recesses 91 carried on the outward side wall of the click ring 9. If the click ring 9 is turned over, the balls 12 come into opposition with the rows of clicking recesses 92 carried on the other side wall of the click ring 9.

The mode selector 11, which is arranged axially outwardly of the retainer 10, comprises a resin presser cover 15 and a metallic selector disc 17. The presser cover 15 has a central cylindrical projection 152 insertable into the axial hole 90 of the lever mount 8 (see FIG. 16). The cylindrical projection 152 is formed at its forward end with an annular flange 152a engageable in the axial grooves 90a within the axial hole 90 of the lever mount 8 (see FIG. 18). Thus, the presser cover 15 itself is rotatable and axially movable relative to the lever mount 8 with the annular flange 152a guided in the axial grooves 90a. The high elasticity of the presser cover 15 which is made of a resin enables the annular flange 152a to elastically forced into the axial hole 90 of the lever mount 8 past the selector positioning portion 88.

The presser cover 15 further has an outer annular projection 151 in which the selector disc 17 is fitted. More particularly, the selector disc 17 is formed on its outer circumference with a pair of diametrically opposite first cutouts 171 and a pair of diametrically opposite second cutouts 172, and the annular projection 151 is provided with a pair of diametrically opposite engaging projections 151a fitting in the first cutouts 172 to prevent the rotation of the disc 17 relative to the cover 15. The second cutouts 171 and the annular projection 151 define a pair of recesses 11a for retraction thereinto of the balls 12 as will be hereinafter described.

The selector disc 17 also has a central oblong opening 173 which is continuous with a corresponding central recess 155 formed in the wall thickness of the cover 15 around the cylindrical projection 152. The central opening 173 and the central recess 155 equally have a shape corresponding to the cross sectional shape of the retainer mounting portion 87 of the lever mount 8, so that the mode selector 11 is angularly lockable at every 90 degree position by the square positioning end 88 which is flush or continuous with the retainer mounting portion 87 except where the step faces 89 are provided.

One side wall of the selector disc 17 provides a pair of backup portions 111 at a pair of diametrically opposite positions thereof adjacent to the positioning cutouts 172.

The above described components of the lever assembly are clamped in place by a clamping bolt 16 which has a threaded shank 161 loosely insertable through the cylindrical projection 152 of the cover 15 for screw engagement with the threaded bore 23 of the support shaft 2.

Figure 14:
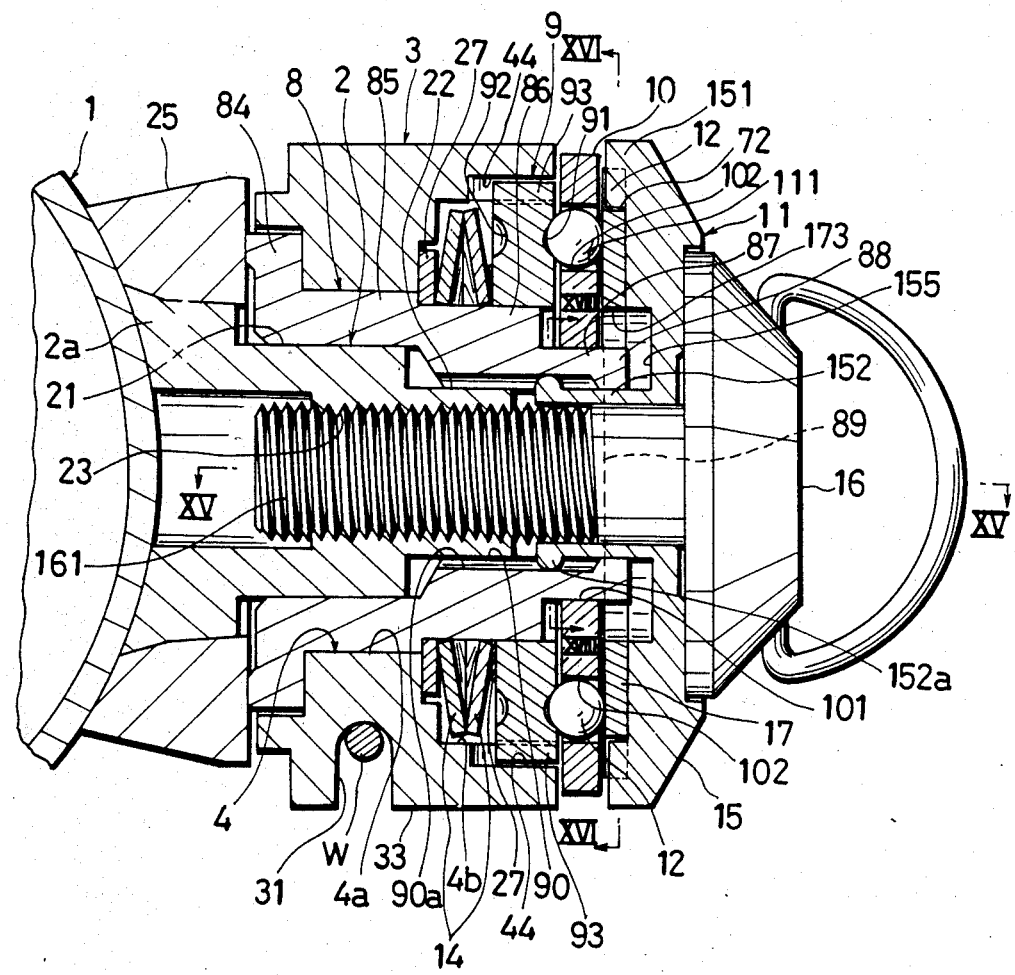
FIG. 14 is an enlarged fragmentary section taken on lines XIV—XIV in FIG. 12 showing the lever assembly in a clicking operational mode.
Figure 15:
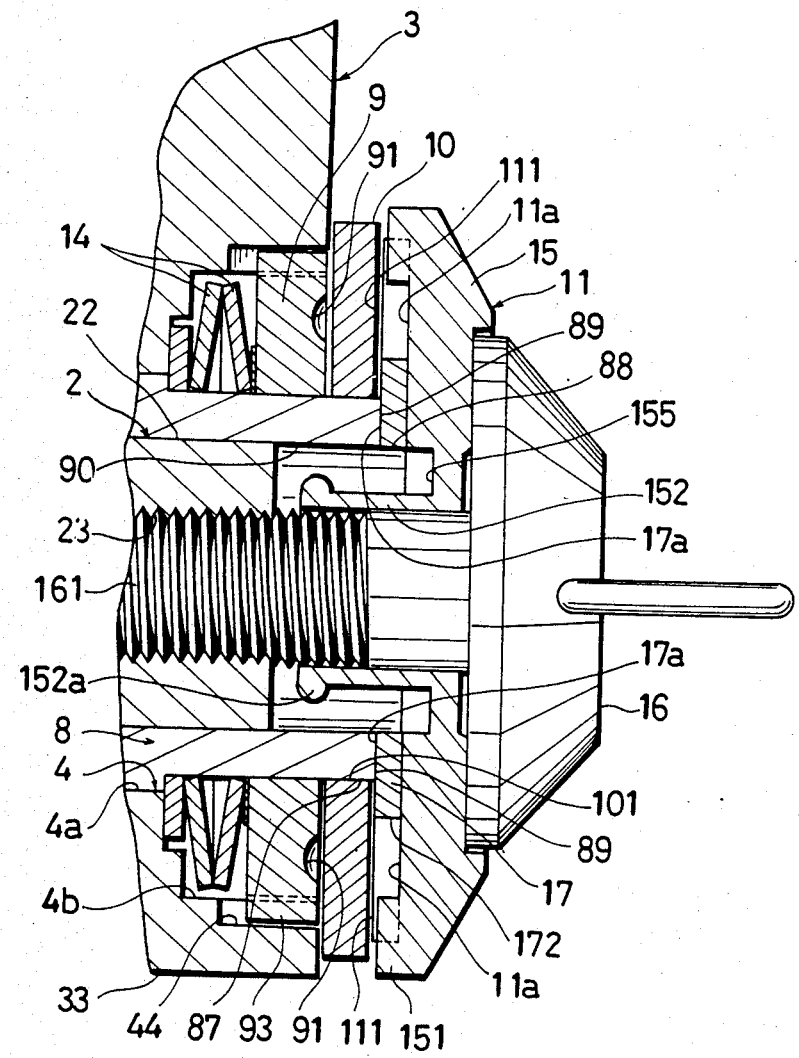
FIG. 15 is an enlarged fragmentary section taken on lines XV—XV in FIG. 14.
Figure 16:
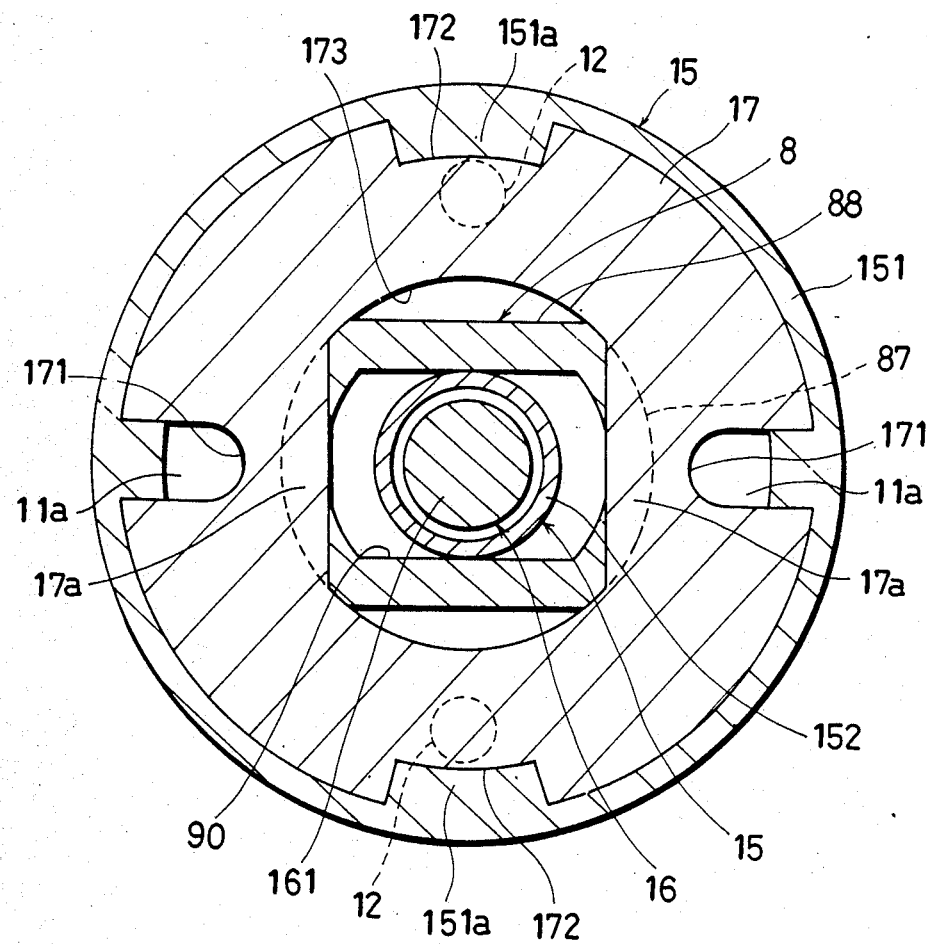
FIG. 16 is an enlarged section taken on lines XVI—XVI in FIG. 14.
Figure 17:
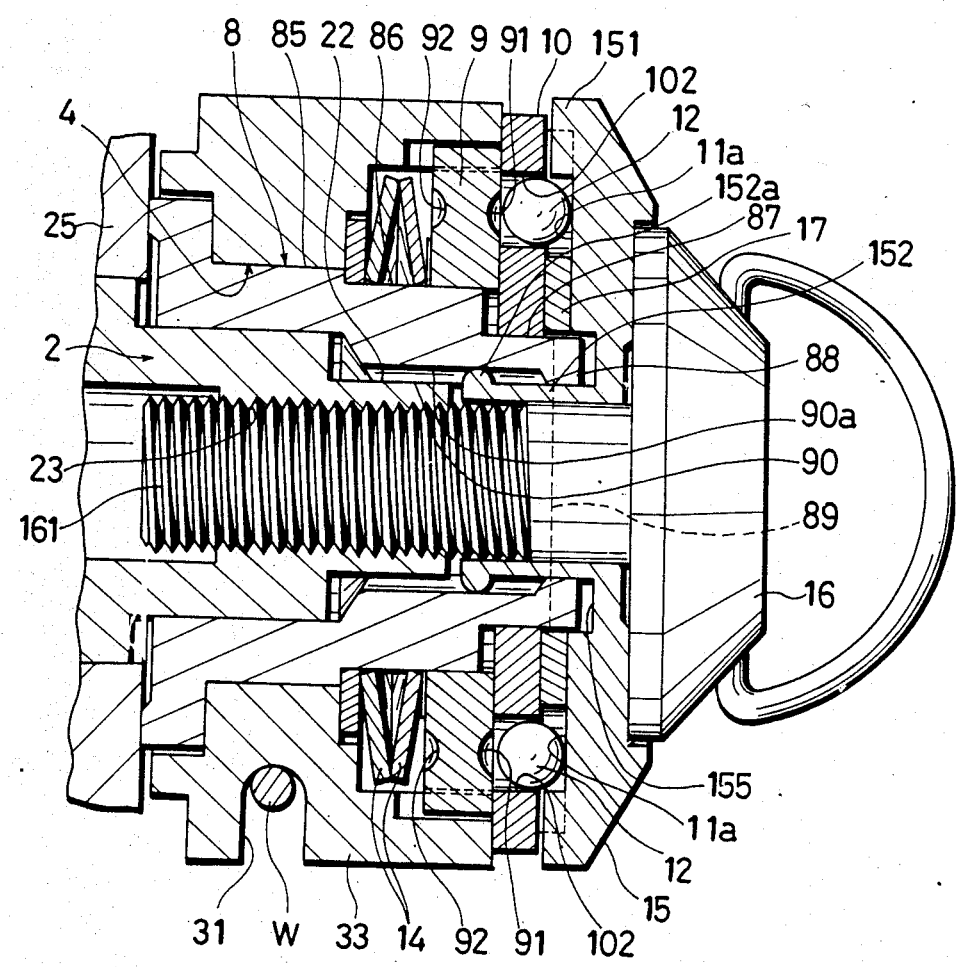
FIG. 17 is a sectional view similar to FIG. 14 but showing the lever assembly in a non-clicking operational mode.

In the condition shown in FIGS. 14 to 16, the mode selector 11 is locked on the square positioning end 88 of the lever mount 8 with the oblong opening 173 of the selector disc 17 angularly displaced 90 degrees relative to the similarly oblong or flattened portion 87 of the lever mount. In this state, the selector disc 17 is in abutment with the step faces 89 of the lever mount 8 to prevent excessive axial displacement of the mode selector 11 toward the click ring 9, whereby the backup portions 111 of the mode selector 11 push the balls 12 into elastic abutment with the click ring 9 under an appropriate pressure. When the control lever 3 is pivoted to cause rotation of the click ring 9, each of the balls 12 clickingly engages in and disengages from each of the five clicking recesses 91a–91e in each arcuate row.

Apparently, a six stage clicking mode is obtainable simply by turning over the clicking ring 9.

For changing to a non-clicking operational mode from the above clicking mode, the bolt 16 is loosened enough to allow the selector disc 17 to axially disengage from the locking end 88 of the lever mount 8. Subsequently, the mode selector 11 is rotated until the oblong opening 173 of the selector disc 17 exactly coincides with the flattened portion 87 of the lever mount 8. Finally, the bolt 16 is again tightened up, so that the selector disc 17 advances slightly past the step faces 89 onto the retainer mounting portion 87 and comes into pressing contact with the retainer disc 10 which in turn comes into frictional abutment with the control lever 3. In this state, the balls 12 are permitted to retreat into the shelter recesses 11a of the mode selector. Thus, the control lever 3 can be steplessly pivoted and frictionally held at any pivotal position.

The invention thus being described, it is obvious that the same may be varied in many ways besides the illustrated examples and the already described modifications. Such variations are not to be regarded as a departure from the spirit and scope of the present invention, and all such modifications as would be obvious to those skilled in the art are intended to be included within the scope of the following claims.

I claim:

1. A bicycle speed change lever assembly comprising:
a support shaft fixed to a bicycle frame;
a control lever having a hollow boss portion rotatable about said support shaft and having a handle portion integral with and extending from said boss portion;
an annular internal space formed in said boss portion;

a click ring accommodated in said internal space and co-rotatable with said boss portion;

said click ring being provided on one side surface thereof with at least one arcuate row of clicking recesses;

a retainer disposed in juxtaposition to said click ring in facing relation to said one side surface of said click ring and non-rotatable relative to said support shaft;

at least one steel ball loosely retained by said retainer in corresponding relation to said row of clicking recesses and having a diameter larger than a wall thickness of the retainer;

elastic means for urging said click ring toward said retainer;

a mode selector disposed in juxtaposition to said retainer so that said retainer is interposed between said mode selector and said click ring;

said mode selector being provided on one side thereof facing said retainer with at least one backup portion and at least one shelter recess;

said mode selector being angularly adjustable to take a selected one of angular positions which include a backup position in which said backup portion forces said ball into abutment with said one side surface of said click ring and a non-backup position in which said ball is allowed to retreat into said shelter recess; and means for locking said mode selector at said selected one of angular positions.

2. The lever assembly as defined in claim 1, wherein said mode selector is in the form of a single ring whose one side surface is formed with at least one circumferential groove to serve as said shelter recess and with at least one bulge interrupting said circumferential groove to serve as said backup portion.

3. The lever assembly according to claim 2, wherein the other side surface of said mode selector in the form of said single ring has a plurality of positioning recesses formed therein and aligned in a circle at a constant angular interval; and wherein the lever assembly further comprises a locking member non-rotatable relative to said support shaft and having at least one engaging protuberance fitted in a selected one of said positioning recesses.

4. The lever assembly according to claim 1, wherein said mode selector comprises:

a ring plate provided on its outer circumference with at least one radially outward tongue serving as said backup portion and on its inner circumference with at least one radially inward projection;

a presser cover having an external cylindrical extension and a central, axially inward annular projection formed on its circumference with a plurality of equiangularly spaced spline grooves;

said ring plate being fittable on said central annular projection of said cover with said radially inward projection engaging with a selected one of said spline grooves; and said external cylindrical extension of said cover together with said outward tongue and the outer circumference of said ring plate defining at least one circumferentially extending recess serving as said shelter recess.

5. The lever assembly according to claim 1, wherein said annular space of said boss portion is divided by an inwardly directed intermediate flange into a first chamber housing a ratchet mechanism therein and a second chamber accommodating said click ring and said elastic means therein.

6. The lever assembly according to claim 5, wherein said ratchet mechanism comprises:

a ratchet roller having on its outer circumference a number of teeth and rotatably supported on said support shaft as interposed between a pair of friction rings;

a ratchet pawl having a front edge and pivotally supported by said cylindrical boss portion of said control lever; and a spring for biasing said front edge of said ratchet pawl into engagement with said teeth of said ratchet roller.

7. The lever assembly according to claim 5 which further comprises:

a generally cylindrical, hollow lever mount non-rotatably mounted on said support shaft and fitted into said boss portion to define said second chamber;

said lever mount having an outwardly directed intermediate collar in abutment with said inwardly directed flange of said boss portion; and said lever mount further having a flattened portion on which said click ring, said retainer and said mode selector are supported.

8. The lever assembly according to claim 1, wherein the other side surface of said click ring is also provided with at least one arcuate row of clicking recesses differing in pattern from the row of clicking recesses on said one side surface of said click ring.

9. The lever assembly according to claim 1, wherein said boss portion of said control lever has an axial through-hole which is stepped to provide a smaller diameter section rotatably fitting on a generally cylindrical, hollow lever mount non-rotatably mounted on said support shaft, and a larger diameter section defining said annular internal space around said lever mount for accommodating said click ring and said elastic member.

10. The lever assembly according to claim 9, wherein said lever mount comprises:

an annular end flange engageable with one side surface of said boss portion;

a cylindrical, lever mounting portion formed adjacent said end flange and closely fitting in said smaller diameter section of said axial through-hole;

a diametrically reduced, click ring mounting portion formed adjacent said lever mounting portion and disposed in said larger diameter section of said axial through-hole for rotatably supporting the click ring;

a partially flattened, retainer mounting portion formed adjacent said click ring mounting portion and extending axially outwardly from the other side surface of said boss portion for non-rotatably supporting said retainer thereon;

said retainer mounting portion having a pair of flattened surfaces formed on opposite sides thereof;

a generally square end portion for positioning said mode selector; and a pair of opposite sides of said square end portion being continuous with said pair of flattened surfaces while a remaining pair of opposite sides of said square end portion are discontinuous with said flattened surfaces to form thereby a pair of step faces.

11. The lever assembly according to claim 10, wherein said mode selector comprises:
- a presser cover having an outer annular projection and a central cylindrical projection insertable into said cylindrical lever mount;
- a selector disc non-rotatably fitted in said outer annular projection of said cover and provided in its outer peripheral portion with at least one cutout;
- said selector disc being centrally formed with an elongate opening which is closely fittable on said partially flattened, retainer mounting portion of said lever mount and which communicates a corresponding central recess formed in a wall thickness of said presser cover;
- said cutout of said selector disc together with said outer annular projection of said cover defining a recess which serves as said shelter recess;
- one side surface of said selector disc which faces said retainer serving as said backup portion when said selector disc is locked on said square end portion of said lever mount with said elongate opening of said disc angularly deviated relative to said retainer mounting portion of said lever mount,
- said one side surface of said selector disc coming into pressing contact with said retainer to bring it into frictional abutment with the other side surface of said boss portion when said selector disc is locked on said square end portion of said lever mount with said elongate opening of said disc coinciding with said retainer mounting portion.

* * * * *